March 15, 1927.    M. BICHEROUX    1,621,054
TRANSPORT TABLE FOR ROLLED SHEET GLASS
Filed July 1, 1925
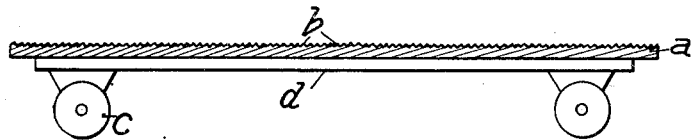
Inventor:
Max Bicheroux
by Hutchinson
Atty.

Patented Mar. 15, 1927.

1,621,054

UNITED STATES PATENT OFFICE.

MAX BICHEROUX, OF HERZOGENRATH, NEAR AIX-LA-CHAPELLE, GERMANY.

TRANSPORT TABLE FOR ROLLED SHEET GLASS.

Application filed July 1, 1925, Serial No. 40,931, and in Germany July 10, 1924.

My invention has relation to the manufacture of raw plate glass and more especially to the tables which receive the rolled plate emerging from between the rolls of a glass rolling machine and which serve for transferring this plate from the rolling machine to the annealing oven. It is an object of my invention to provide a transporting table of this kind, which is more durable and lighter in weight than similar transporting tables hitherto used.

Raw plate glass is now manufactured by melting the raw material in pots and pouring the molten contents of the pots either onto a stationary table in front of a roller, which being traversed along the table rolls the molten metal into a plate or sheet, or onto the rolls of a glass rolling machine which reduce the lump of glass to a plate of the desired thickness, this plate on emerging from between the rolls being deposited on a transport table on wheels running on a track leading to the annealing oven.

The portable transport tables hitherto used for transferring the glass plates from the rolling machine to the annealing oven were made of refractory material such as fire clay, and in view of the low mechanical strength of this material the tables had to be made very bulky and weighty and nevertheless were very little durable.

The plate glass transport table according to the present invention avoids these drawbacks inasmuch as the plate forming the table proper consists of a suitable metal such as iron, the upper surface of which is formed with projections defining between them depressions.

In the drawings affixed to this specification and forming part thereof a transport table embodying my invention is illustrated diagrammatically in vertical section by way of example.

Referring to the drawings, d is a frame supported on wheels c, and a is an iron plate mounted on the frame and having narrow projections b defining between them depressions formed on its upper surface, these depressions being shown in the drawing at an exaggerated scale, as in reality their depth will as a rule not exceed 10 mm., although deeper depressions may be made use of if necessary.

Obviously the metal plates can be made comparatively thin, so as to weigh far less than the thick fire-clay plates hitherto used, and their mechanical strength is far superior, cracking or breaking of an iron plate being practically excluded.

At first sight the idea of replacing the refractory plates by metal plates appeared impracticable for the reason that an ordinary metal plate, being an excellent conductor of heat, will abstract so much heat from the rolled sheet of glass emerging from between the rolls and the temperature of which is already greatly reduced, that it seemed impossible to employ metal tables without at the same time exposing the glass plates to cracking owing to the excessive abduction of heat.

I have now ascertained that, if the metal tables are formed with narrow projections defining between them depressions or corrugations in their upper surface, this abduction of heat is lessened to such an extent as to render the use of such tables perfectly feasible. Warping of the metal plate does not occur inasmuch as the convection of heat from the rolled glass plate to the metal plate is not great enough to cause this latter to be heated highly.

Obviously the projections and depressions formed in the upper surface of the table may vary in form and section.

I wish it to be understood that I do not desire to be limited to the exact details of construction shown and described, for obvious modifications will occur to a person skilled in the art.

I claim:

A metallic transport table for receiving plate glass from a forming machine, having on its upper surface a series of sharp glass contracting and supporting projections separated from each other.

In testimony whereof I affix my signature.

MAX BICHEROUX.